D. F. Welsh,
Cotton Planter.
No. 110,807. Patented Jan. 3, 1871.

Witnesses:
Fred. Artos
Edward D. Callahan

Inventor:
D. F. Welsh
per Edw. Artos
Attorneys

United States Patent Office.

DWIGHT F. WELSH, OF NEVADA, OHIO.

Letters Patent No. 110,807, dated January 3, 1871.

IMPROVEMENT IN COTTON-PLANTERS.

The Schedule referred to in these Letters Patent and making part of the same.

*To all whom it may concern:*

Be it known that I, DWIGHT F. WELSH, of Nevada, in the county of Wyandot and State of Ohio, have invented certain Improvements in Cotton-seed Planters; and I do hereby declare that the following is a full, clear, and exact description thereof, reference being had to the annexed drawing making part of this specification, in which—

The same letters are used in both figures to indicate identical parts.

Figure 1:
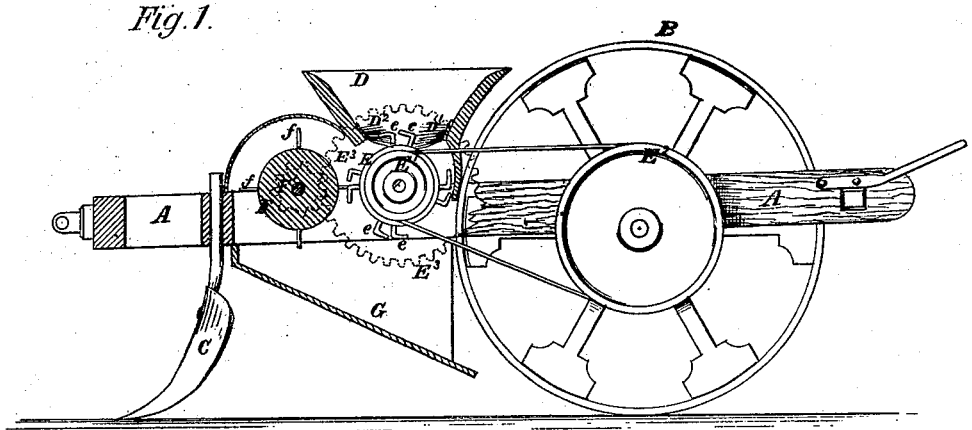
Figure 1 is a side elevation, showing a portion in section of my improved machine.
Figure 2:
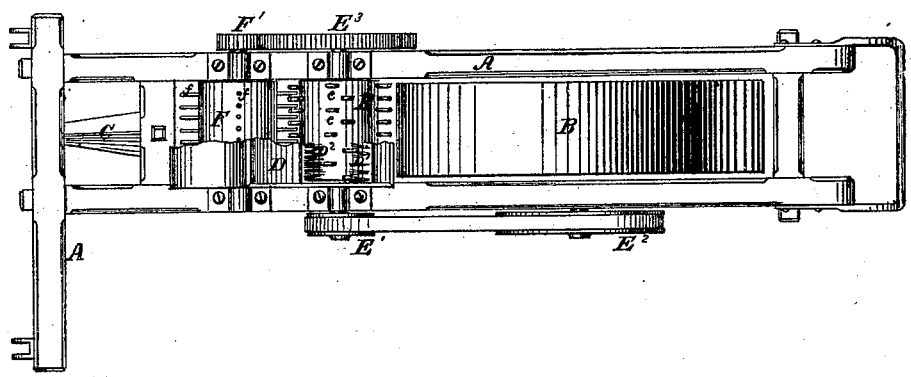
Figure 2 is a plan view, portion of the hopper and cover to the conductor spout being broken away to show the interior arrangement.

The object of this invention is to provide a simple and effective machine for planting cotton-seed; and My improvements consist—

First, in the employment of a seed-shaft, constructed with hook-shaped projections or fingers in clusters of three, by which the seed is drawn out of the hopper and carried to the delivery spout, a hopper provided with a brush upon each side of the discharge opening of the hopper, to form, together with the seed-shaft, the bottom thereto, while one of said brushes also serves to brush off any surplus seed from the teeth of the seed-shaft and retain it in the hopper, and a revolving whipper, consisting of a shaft with several series of short spring wires to knock the seed out of the clusters of teeth into the delivery-spout; and Second, the combination of a seed-shaft with a revolving whipper, all of which will be made more fully to appear in the description and claim, which follow:

To enable those skilled in the art to make and use my invention, I will proceed to describe its construction and operation.

In the annexed drawing—

A represents the frame of the machine, composed of longitudinal and transverse timbers firmly jointed together, and provided at the forward end with suitable clips, to which a thill or tongue is to be attached, and at the rear end with a handle by which to manipulate it.

The frame is mounted upon a broad-tread wheel or roller, B, which is arranged within the former in rear of the seed-delivery spout, and serves, besides supporting the frame and appendages, to cover the seed and roll the bed.

The shovel C is arranged in front of the delivery spout, and opens the furrow into which the seed is dropped.

The seed is contained in the hopper D, of suitable capacity, which is placed across the frame above the seed-shaft E, which latter forms its bottom together with the brushes $D^1$ and $D^2$.

These brushes are secured upon the inside of the hopper, opposite to each other, near the bottom, so that their bristles will be in contact with the seed-shaft.

The journals of the latter project through their bearings upon each side of the frame, and upon the overhung end of one, a pulley, $E^1$, is mounted, which is driven by means of a belt from a pulley, $E^2$, upon the axle of the supporting roller B, as shown, while the other carries a spur-wheel, $E^3$.

The seed-shaft is provided with hook-shaped fingers or teeth $e\ e$ arranged thereon, either in longitudinal rows, as shown, or spirally, but always in clusters of three set in a triangle.

The hooks of the teeth are bent in the direction in which the shaft revolves, and the seeds are pulled out of the hopper by them, and one or more retained in each space inclosed by a cluster.

As each cluster in its revolution passes the brush $D^2$, the surplus seeds are brushed from the teeth and retained in the hopper, while the seeds within the cluster are carried from the hopper to the delivery spout to be dropped from it into the furrow made by the shovel.

To assist in the discharge of the seeds from the teeth, I provide a revolving whipper, F, which is arranged in the upper portion of the delivery spout G, in front of the seed-shaft, it being rapidly revolved by means of a pinion, $F'$, which gears into and is driven by the spur-wheel $E^3$ on the seed-shaft.

The whipper is composed of a shaft with several rows of short spring wires $f\ f$, which, in revolving, pass in close proximity to the periphery of the seed-shaft and between its teeth, knocking out all the seeds which may not fall out by their own gravity.

The wires $f$ should be made so yielding that they will not injure the seed in knocking it out of the clusters of teeth on the seed-shaft.

What I claim as my invention, and desire to secure by Letters Patent, is—

1. The seed-shaft $E^1$, when constructed with hook-shaped teeth $e\ e$, arranged thereon in triangular clusters, the brushes $D^1\ D^2$, and the revolving whipper $F'\ f$, when constructed substantially in the manner herein shown and described.

2. The combination of the seed-shaft E $e$ and the revolving whipper F $f$, substantially as set forth.

In testimony whereof I have signed my name to the foregoing specification in the presence of two subscribing witnesses.

DWIGHT F. WELSH.

Witnesses:
G. W. BALLIET,
D. J. MINIEB.